No. 643,419. Patented Feb. 13, 1900.
T. B. LAMBERT.
PHONOGRAPH.
(Application filed Oct. 5, 1899.)

(No Model.) 4 Sheets—Sheet 1.

Witnesses: Inventor.
Chas. E. Gaylord, Thomas B. Lambert,
Thomas B. McGregor. By Banning & Banning & Sheridan,
Attys.

No. 643,419. Patented Feb. 13, 1900.
T. B. LAMBERT.
PHONOGRAPH.
(Application filed Oct. 5, 1899.)

(No Model.) 4 Sheets—Sheet 2.

Witnesses: Inventor:
Thomas B. Lambert,
By Banning & Banning & Sheridan,
Attys.

No. 643,419. Patented Feb. 13, 1900.
T. B. LAMBERT.
PHONOGRAPH.
(Application filed Oct. 5, 1899.)
(No Model.) 4 Sheets—Sheet 3.

Witnesses:
Inventor:
Thomas B. Lambert,
By Banning & Banning & Sheridan,
Attys.

No. 643,419. Patented Feb. 13, 1900.
T. B. LAMBERT.
PHONOGRAPH.
(Application filed Oct. 5, 1899.)
(No Model.) 4 Sheets—Sheet 4.
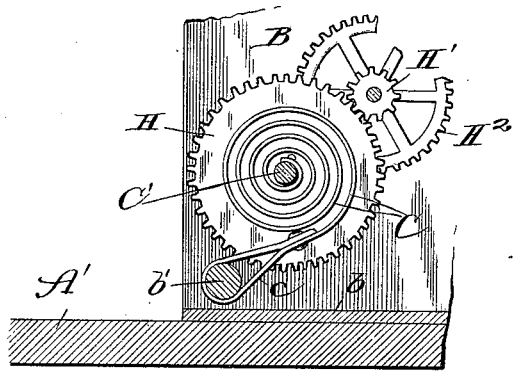
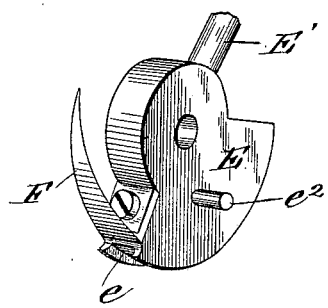
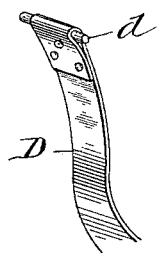
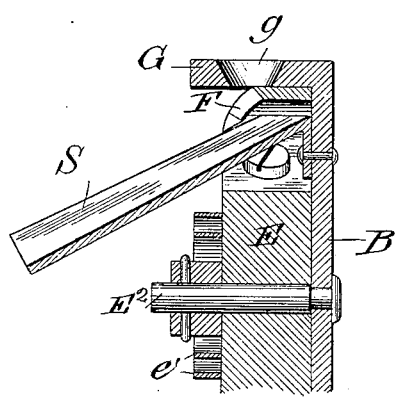
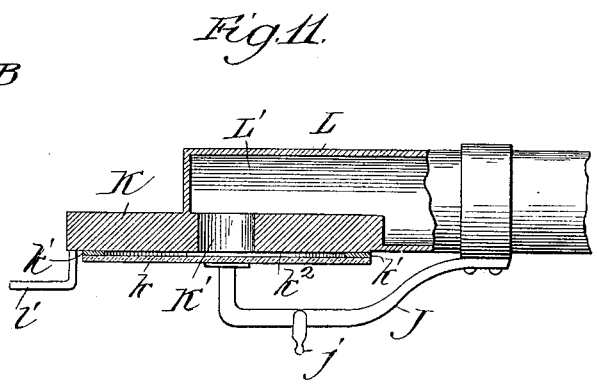
Witnesses:
Chas. E. Taylor,
Thomas B. McGregor.
Inventor:
Thomas B. Lambert,
By Banning & Banning & Sheridan,
Attys.

UNITED STATES PATENT OFFICE.

THOMAS B. LAMBERT, OF CHICAGO, ILLINOIS, ASSIGNOR TO ORSON C. WELLS, ROBERT PRINGLE, ALBERT D. PHILPOT, BRIAN F. PHILPOT, AND HENRY J. COSGROVE, OF SAME PLACE.

PHONOGRAPH.

SPECIFICATION forming part of Letters Patent No. 643,419, dated February 13, 1900.

Application filed October 5, 1899. Serial No. 732,609. (No model.)

*To all whom it may concern:*

Be it known that I, THOMAS B. LAMBERT, a citizen of the United States, residing at Chicago, in the county of Cook and State of Illinois, have invented certain new and useful Improvements in Phonographs, of which the following is a specification.

The object of my invention is to construct a phonograph the operating parts of which can be inclosed within the case or shell of a cigar-cutter, with the parts so constructed and arranged in relation to the movements of the operating-arm of the blade of the cigar-cutter as to cause such movements to set the mechanism in operation and produce from the record of the phonograph any phrase, words, or sound desired; and the invention consists of the several parts, combinations of elements, and features of construction hereinafter described and claimed.

Figure 1:
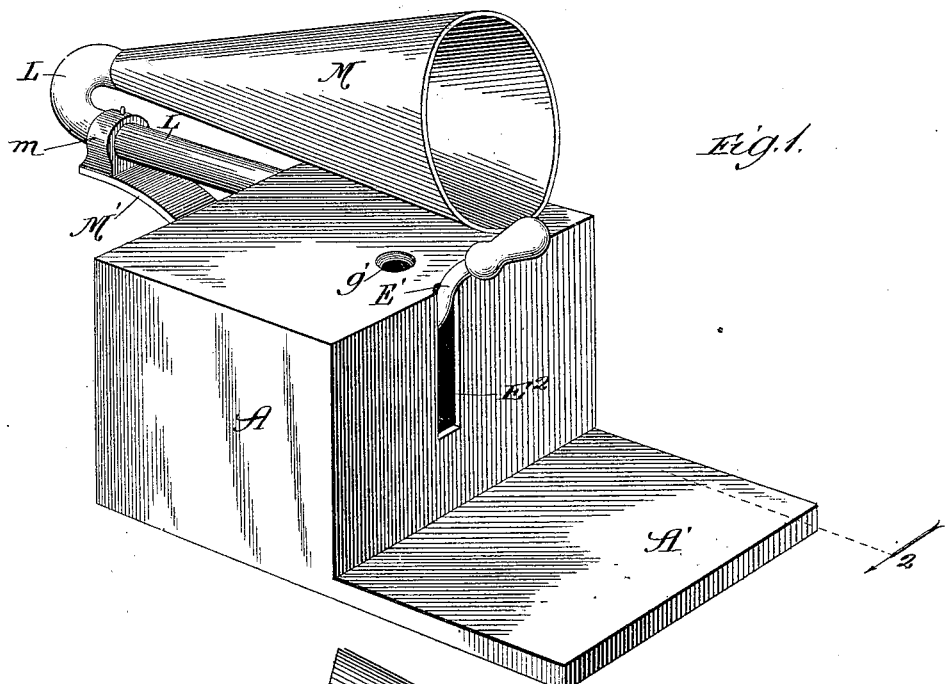
Figure 2:
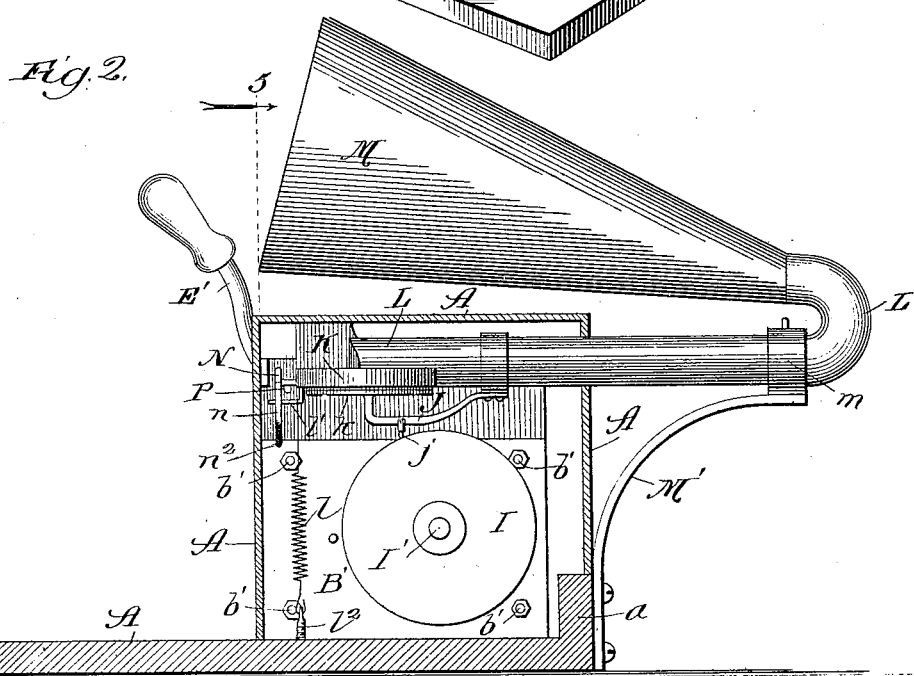
Figure 3:
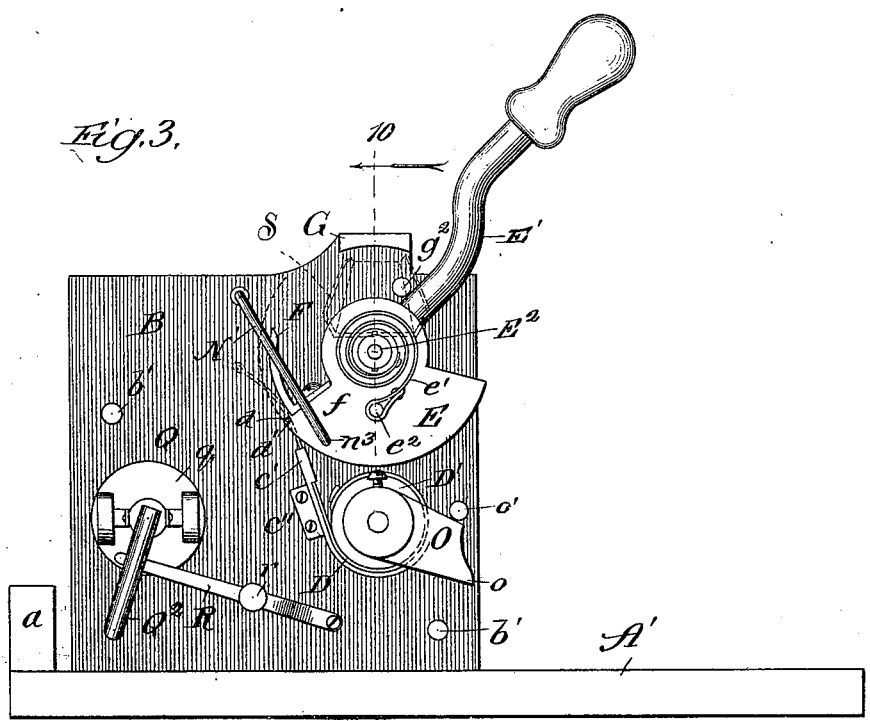
Figure 4:
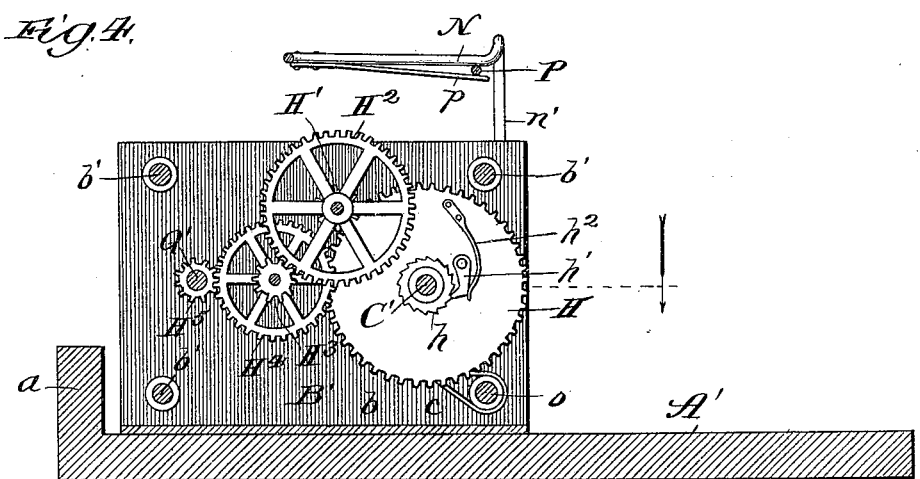
Figure 5:
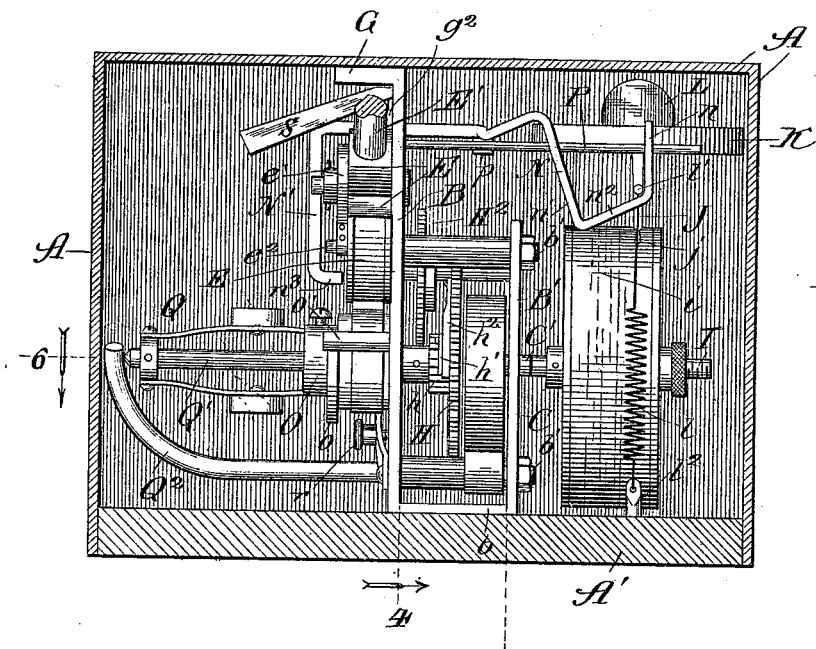
Figure 6:
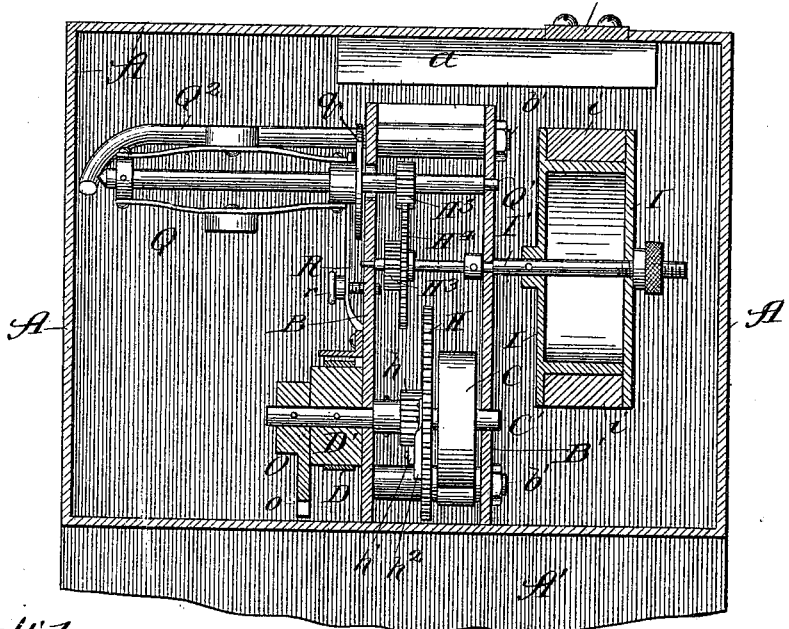

Referring to the drawings, Figure 1 is a perspective view showing a cigar-cutter with my invention applied thereto; Fig. 2, a sectional view of the casing and base of the cigar-cutter, showing the phonograph in elevation; Fig. 3, a side elevation with the casing or shell of the cigar-cutter removed; Fig. 4, a sectional elevation through the phonograph-operating mechanism with the base in section; Fig. 5, a front elevation of the mechanism with the casing and base in section and the handle of the cigar-cutter broken off; Fig. 6, a section on line 6 of Fig. 4 looking in the direction of the arrow; Fig. 7, a detail in section on line 7 of Fig. 5, showing the main or power spring and a part of the driving-gear; Fig. 8, a perspective view of the segmental head or arm for operating the cutting-blade and the winding-strap; Fig. 9, a perspective view of the free end of the winding-strap; Fig. 10, a detail in section of the segmental head or arm and cutter, showing also the discharge chute or spout; and Fig. 11, a detail, partly in section, of the stylus and its carrying-arm and the diaphragm and parts connected therewith.

All cigar-cutters employ in their construction a movable blade actuated either by means of a projected handle, or a rod having a vertical reciprocation, or a release-spring, or in some other manner, so that the blade has an advance movement to perform the cutting and is then returned to its normal position for the next operation. It is the purpose of my invention to utilize or employ the movements of the blade in a cigar-cutter to energize the motor of a phonograph, and thereby operate the record either for advertising, amusement, entertainment, or other purpose, and, while this is the main object or design of my invention, it is to be understood that the arrangement, construction, and operation of the parts are adapted for use and can be used in operating phonographs in other ways than through or by the movements of the blade of a cigar-cutter.

In carrying out my invention as applied to a cigar-cutter I provide a case or shell A, mounted on a base A'. Attached to the base, within the casing or shell, is a frame composed of side pieces or plates B and B', with a bottom connection $b$ for attaching the frame to the base by screws or otherwise and, as shown, the plates are supported by cross-rods $b'$. The power or motor spring C is located between the plates of the frame and is fixedly attached at one end to a main shaft C', and at its free end is attached to one of the cross rods or stanchions $b'$ by a loop $c$ or otherwise, or such end can be attached to some other stationary part of the frame. The shaft C' extends beyond one of the supporting sides or plates of the frame and has fixedly secured thereto a head or drum D', to which is attached one end of a strap D, the free end of which in the form shown has a pin $d$. In its normal position the free end of this strap is bent away from the head E until the mainspring is unwound, when it is drawn into position for reëngagement with the head at the point $d$. The winding-strap is guided between the head or drum and a guide-plate $c$, the upper end of which has an inclosing head $c'$, through which the strap passes and is thereby maintained in a straight line of movement and, as shown, the guard or guide is attached to one plate of the frame by a flange or lip $c^2$. A segmental head or arm E is located adjacent to the drum and on one side has a notch or recess $d'$ to engage with the cross-pin of the strap. The acting face of this head or arm has a groove or recess $e$ for the winding-strap, and the head or arm has a handle portion $E'$ and is mounted as a whole loosely on a pin or stud $E^2$. The stud has attached thereto one end of a coiled spring $e'$, the free end of which is looped or otherwise attached to a pin $e^2$ on the segmental head or arm, which spring is for the purpose of returning the head after each depression or downthrow of the handle, such movement of the handle winding the spring on itself, so as to give the required tension and return the parts. The head or arm carries a knife or blade F, attached thereto by a shank $f$, and this knife or blade coacts with its companion shear-head G, in which is an opening $g$, coinciding with a hole $g'$ in the case or shell A for the entering of the tip end of a cigar in position to be severed by the advance of the shear or blade F.

The main shaft $C'$ has loosely mounted thereon a gear H, which gear is adjacent to a ratchet-wheel $h$, the teeth of which are engaged by a pawl $h'$, pivotally attached to the gear and held in engagement by a spring $h^2$, so that with the winding up of the main or power spring through the revolving of the main shaft from the winding-strap the pawl rides over the ratchet-teeth, but engages therewith at the cessation of the winding, connecting the main gear with the main shaft, so that with the recoil of the power-spring power will be imparted to the gear. The main gear meshes with a pinion $H'$ on a shaft which carries a second gear $H^2$, which in turn meshes with a pinion $H^3$ on the shaft which carries the record, and this shaft also has thereon a gear $H^4$, which meshes with a pinion $H^5$ on the shaft of the governor. It will thus be seen that power from the mainspring is transmitted through the gearing to revolve the record and operate the governor, and this train of gear is all located within the space of the frame formed by the plates B and B'.

The record-shaft has fixed thereon a cylinder I, which carries the record $i$, one head of the cylinder being removable for taking off and putting on the records. A spring-arm J carries a stylus $j$ to engage the surface of the record. This spring-arm, as shown, is attached by a collar or band to the tube of the sound-amplifying chamber, and its free end is in contact with the diaphragm $k$, which diaphragm is attached by an adhesive gasket $k'$ or in any other suitable manner to a casing or mounting K, so as to leave a cell $k^2$ between the diaphragm and the casing. The casing or mounting has a central opening or passage $K'$, which leads into the sound-amplifying chamber $L'$, formed by the interior of a tube L, to which the casing or mounting can be secured in any suitable manner, or the end of the tube and the casing or mounting can be made of one piece. The sound-amplifying chamber at its outer end communicates with the interior of a horn M, secured to the end of the tube L. The tube at its outer end passes through a collar $m$, pivotally mounted on the end of a supporting-arm $M'$, secured to a cross-piece $a$ of the base at its lower end in the arrangement shown, and instead of having the collar pivotal so as to turn the tube could be pivotally mounted in a stationary collar, so as to turn and provide for the necessary movement both in a vertical and lateral direction for the engagement and disengagement of the stylus with the record.

A spring $l$ is connected at one end to a pin $l'$, extending out from the casing or mounting of the diaphragm and attached at its other end to a stud $l^2$ on the base. The pin $l'$ projects over the outer end of an arm N, which arm is preferably formed of wire and bent so as to have an outer portion $n$ and an inner portion $n'$, forming the stops for limiting the travel of the stylus and connected by an inclined portion $n^2$, which provides the means for returning the stylus at the completion of its operation, as hereinafter described. The arm N extends rearwardly and laterally through the plate B and is continued as a lever $N'$ with a turned end $n^3$. The end $n^3$ is arranged in the path of travel of an engaging face $o$ on an arm O, fixedly attached to the end of the main shaft $C'$ outside of the winding-strap drum. This arm O is moved with the rotation of the main shaft from the winding-strap, and as it moves upward the face $o$ thereof engages the end $n^3$ and lifts the lever $N'$, rocking the arm N and raising the outer end of such arm, so that the stylus will be clear of the record and again slide down on the incline $N^2$ and assume its normal position, and in so sliding down the movement is assisted by the spring $l$, which spring also assists in maintaining the stylus in engagement with the record-helix. The return movement of the arm O is limited by a pin $o'$ on the frame-plate in the arrangement shown.

The relation between the rotation of the main shaft to wind the main or power spring, the throw of the lever or handle of the cutter to complete the cutting off of the cigar-tip, and the throw of the arm O is such that until the spring is wound to its full limit by the full downward throw of the cutter handle or lever the arm O will not be carried to a position where it will fully raise the lever $N'$ to bring the outer end of the arm N into position to raise and return the stylus. By this arrangement it will be seen that unless the cutting-lever is carried to the full limit of its downward throw the stylus will not be returned to its "normal position," by which is meant its position when ready to operate, and because of this no sound will be produced. This makes the movement of one part entirely dependent on the full movement of the coacting parts in order to have the apparatus perform its full operation or none at all.

A stop-wire P extends across the space of the outer end of the returning-arm of the stylus to prevent any abnormal displacement of the stylus and diaphragm. The speed of the gear can be controlled by any suitable governor. A governor Q, adapted to control the speed, is shown mounted on a shaft Q', with the outer end of the shaft supported on an arm $Q^2$. The governor is controlled or regulated by a friction-arm R, preferably of a spring form, which is regulated as to the pressure it exerts on the friction-disk $q$ of the the governor by an adjusting-screw $r$.

The operation will be understood from the foregoing description, but briefly stated is as follows: The tip end of a cigar is inserted through the opening of the case and the stationary shear or blade so as to be severed by the movable shear or blade for the tip when severed to pass into a chute or discharge-spout S to pass down clear of the devices. The chute can be attached to the stop-pin $g^2$ for limiting the return throw of the cutter handle or lever or in any other suitable manner, so as to be underneath the cutters, with a clear space for the passage of the movable shear or blade. The full throw of the cutter-handle downward moves the segmental head or arm upward, lifting the winding-strap for such movement through the drum or head to rotate the main shaft and wind the power or main spring, and at the same time with the full throw of the lever or arm O actuate the lever N' and raise the end of the arm N for the return of the stylus to its normal position for engagement with the record. On the release of pressure the pin $d$ on the winding-strap by reason of the bent position of the strap away from the head E will become disengaged from the shoulder $d'$ and will remain so disengaged until the main spring resumes its unwound position. The downward throw of the cutter handle or lever rotates the ratchet for the main gear without engagement with the pawl thereof, so that no movement of the train of gear takes place with the winding of the main or power spring. On the release of the handle or lever to return to its normal position the main or power spring is free to act and start the train of gear to operate the phonograph, and such operation continues with the unwinding of the spring and until the arm O engages the stop-pin $o'$, at which time the stylus has completed its travel and the phonograph has performed its work with the stylus at the end of its movement. The insertion of the next cigar to be cut and the operation of the cutter handle or lever again winds the spring and returns the stylus into position for engaging the record and operating the phonograph. The handle or lever of the cutter can be released at any point in its downward throw and will be returned to normal position by the spring $e'$, which spring also returns the handle or lever after it is released on a full downward throw. The release of the cutter handle or lever at any intermediate point of a full throw will not reproduce a record, but the parts will automatically be returned to a position where with a full throw of the handle or lever a record can be reproduced. It will thus be seen that in order to reproduce a record there must be a complete throw of the handle or lever, as otherwise the parts are not brought into position for the operation. This gives a perfect control in reproducing a record, as such reproduction can only occur with the full throw of the actuating handle or lever.

The winding-strap is preferably a ribbon of steel or other material possessing rigidity and flexibility, and its connection with the arm or lever by which it is raised is such as to be self-disengaging, and the disengagement is insured by the quick return of the arm or lever through the action of the return-spring $e'$, which acts quicker than does the main or power spring on its return.

I claim—

1. A cigar-cutter having a phonograph connected therewith, and provided with a spring-motor and winding-lever so arranged that the pressing and releasing of the lever operates the mechanism of the phonograph to reproduce a record, substantially as described.

2. A cigar-cutter and a phonograph mounted on a common base and having the casing of the cutter inclosing the operating parts of the phonograph and mechanism for operating the phonograph through the movements of the cutting-blade, such mechanism comprising a spring-motor inside the casing and a winding-lever having its handle end extending outside the casing, substantially as described.

3. In a phonograph, the combination of a main or power spring, a main shaft, a drum on the main shaft and a winding-strap for winding the spring and adapted to be released from engagement at the limit of winding by the removal of pressure and returned into position for rewinding, substantially as described.

4. In a phonograph, the combination of a main or power spring, a main shaft, a drum on the main shaft, a winding-strap, and an arm or head engaging the strap for winding the spring and disengaging the strap by the removal of pressure from the handle of the head to permit the strap to automatically return into position for a rewinding engagement, substantially as described.

5. In a phonograph, the combination of a main or power spring, a main shaft, a drum on the main shaft, a winding-strap, a movable arm or head engaging the strap for winding the spring and permitting the strap to automatically disengage itself on the release of pressure for moving the head, and an arm on the main shaft for limiting the recoil of the spring, substantially as described.

6. In a phonograph, the combination of a main or power spring, a main shaft, a drum on the main shaft, a winding-strap for the drum, a movable head or arm engaging the strap for winding the spring, a loose gear on the main shaft, a clutch engagement between the gear and the main shaft, and a train of gear actuated from the main gear for operating the record, substantially as described.

7. In a phonograph, the combination of a main or power spring, a main shaft, a drum on the main shaft, a winding-strap, a movable head or arm for the winding-strap, a record actuated by a train of gear from the main or power spring, a guide-arm, a lever for the guide-arm, and an arm on the main shaft for moving the guide-arm lever and shifting the stylus at the completion of the winding movement of the strap, substantially as described.

8. In a phonograph, the combination of a main shaft, a strap for revolving the main shaft to wind a main or power spring, an arm on the main shaft, a lever engaged by the arm, and an arm actuated by the lever to return a stylus to normal position for engagement with its record, substantially as described.

9. In a phonograph, the combination of a record, a stylus coacting with the record, an arm having an inner and outer limit portion with an inclined face between the limit-points, and a lever for actuating the arm through the movement for winding a main or power spring, substantially as described.

10. In a phonograph, the combination of a main or power spring, a main shaft, a winding-strap, and an arm or head engaging the winding-strap and movable to wind the power-spring, substantially as described.

THOMAS B. LAMBERT.

Witnesses:
BRIAN F. PHILPOT,
EPHRAIM BANNING.